US010118701B2

(12) United States Patent
Johannessen et al.

(10) Patent No.: US 10,118,701 B2
(45) Date of Patent: Nov. 6, 2018

(54) AIRCRAFT CABIN LED LIGHTING SYSTEM AND LIGHTING ASSEMBLY

(71) Applicant: B/E AEROSPACE, INC., Wellington, FL (US)

(72) Inventors: Eric Johannessen, Holbrook, NY (US); Brendan Upton, East Patchogue, NY (US); Luis Sam, South Setauket, NY (US); Jeremy Fredrich, West Allis, WI (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 15/453,010

(22) Filed: Mar. 8, 2017

(65) Prior Publication Data

US 2018/0257782 A1  Sep. 13, 2018

(51) Int. Cl.
*H05B 33/08*  (2006.01)
*B64D 11/00*  (2006.01)
*B60Q 3/80*  (2017.01)

(52) U.S. Cl.
CPC ............... *B64D 11/00* (2013.01); *B60Q 3/80* (2017.02); *H05B 33/0845* (2013.01); *H05B 33/0857* (2013.01); *B64D 2011/0038* (2013.01)

(58) Field of Classification Search
CPC ........ B60Q 3/43; B60Q 3/47; B60Q 2900/10; B64D 2011/0038; B64D 11/00; B64D 2203/00; B64D 47/02; B64D 25/00; F21W 2101/06; F21W 2101/08; H05B 33/0803; H05B 33/0815; H05B 33/0812
See application file for complete search history.

(56) References Cited

U.S. PATENT DOCUMENTS

| | | | |
|---|---|---|---|
| 8,207,853 B2 * | 6/2012 | Forster | G06K 19/07749 340/10.41 |
| 8,264,171 B1 * | 9/2012 | Domer | H05B 33/0854 315/291 |
| 9,277,618 B2 * | 3/2016 | Odnoblyudov | H05B 33/0869 |
| 9,392,666 B2 * | 7/2016 | Odnoblyudov | H05B 33/0869 |
| 2002/0047646 A1 | 4/2002 | Lys et al. | |

(Continued)

OTHER PUBLICATIONS

Texas Instruments,"TLC5940 16-Channel LED Driver With DOT Correction and Grayscale PWM Control", published Dec. 2004 (revised Nov. 2015).*

(Continued)

*Primary Examiner* — Tung X Le
*Assistant Examiner* — Borna Alaeddini
(74) *Attorney, Agent, or Firm* — Donna P. Suchy (57) ABSTRACT

The present disclosure is generally directed to an aircraft cabin LED lighting system and lighting assembly, in which each LED light is paired with and controlled by a separate microcontroller, which is individually addressable. In various embodiments, a lighting control device (e.g., a control panel for flight attendants) transmits pixel data to various lighting assemblies around the cabin. These lighting assemblies include the microcontroller-LED light pairs. Each LED light is multicolor and includes multiple LEDs (e.g., one for each color). The pixel data defines a color scheme and/or animation sequence. Each pixel maps to one of the microcontroller-LED pairs. The microcontroller controls the intensity of each LED of the LED light according to the pixel data it receives.

18 Claims, 5 Drawing Sheets

(56) References Cited

U.S. PATENT DOCUMENTS

| | | | |
|---|---|---|---|
| 2003/0048641 A1* | 3/2003 | Alexanderson | F21V 29/004 362/470 |
| 2007/0040696 A1* | 2/2007 | Mubaslat | G01R 31/2635 340/657 |
| 2009/0179751 A1* | 7/2009 | Forster | G06K 19/0717 340/501 |
| 2014/0078772 A1* | 3/2014 | Gaydoul | F21S 43/13 362/555 |
| 2015/0022110 A1 | 1/2015 | Sisto | |
| 2015/0257224 A1* | 9/2015 | Timm | B64D 11/00 315/77 |
| 2016/0323972 A1* | 11/2016 | Bora | H05B 33/0842 |

OTHER PUBLICATIONS

Extended European Search Report dated Aug. 16, 2018 for European Application No. 18157825.3.

* cited by examiner

AIRCRAFT CABIN LED LIGHTING SYSTEM AND LIGHTING ASSEMBLY

TECHNICAL FIELD

The present disclosure relates generally to aircraft cabin lighting and, more particularly, to an aircraft cabin LED lighting system and lighting assembly.

BACKGROUND

Light-emitting diode ("LED") lighting has become very popular for use in homes and in businesses. More sophisticated LED lighting systems include light fixtures that are separately addressable. In such system, a single microprocessor typically controls many individual LEDs. This makes it necessary to include many wires in each light figure—wires that lead from the microprocessor to each individual LED. This consumes a considerable area of valuable printed circuit board ("PCB") real estate.

DRAWINGS

While the appended claims set forth the features of the present techniques with particularity, these techniques, together with their objects and advantages, may be best understood from the following detailed description taken in conjunction with the accompanying drawings of which:

DESCRIPTION

The present disclosure is generally directed to an aircraft cabin LED lighting system and lighting assembly, in which each LED light is paired with and controlled by a separate microcontroller, which is individually addressable. In various embodiments, a lighting control device (e.g., a control panel for flight attendants) transmits pixel data to various lighting assemblies around the cabin. These lighting assemblies include the microcontroller-LED light pairs. Each LED light is multicolor (e.g., red, green, blue) and includes multiple LEDs (e.g., one for each color). The pixel data defines a color scheme and/or animation sequence. Each pixel maps to one of the microcontroller-LED pairs (as specified by the microcontroller's address in the pixel data). The microcontroller controls the intensity of each LED of the LED light according to the pixel data it receives.

The use of a microcontroller for every LED light avoids the expense of multiple microprocessors, the space consumption of multiple lines from a single microprocessor, and the extensive number of support components that would be required if LED drivers were used. Additionally, each microcontroller can store, in its memory, calibration data that it uses to calibrate each pixel that it receives from the lighting control device.

In an embodiment, each LED light of the microcontroller-LED pair is a tricolor LED light that has a common anode, with the low voltage side being electrically connected to the microcontroller. The entire string of LEDs may be powered by 5 volts DC. In one implementation, the microcontrollers are very small and cheap but only need to shift the data in, extract the color information out, multiply the color information by a small calibration factor, and generate different pulse-width modulation ("PWM") signals for the different colors.

According to an embodiment, the output of each LED light (that is, each pixel) can be corrected using one or more cameras to photograph all of part of a lighting assembly, feeding the data captured in the photograph into algorithms or lookup tables, and adjusting the output of the LED lights to make the appropriate correction. Such a correction process may occur during initial manufacturing of a lighting assembly and/or in real time (e.g., with one or more cameras integrated with each lighting assembly).

Possible use scenarios for the lighting system and lighting assembly described herein include accent lighting for an aircraft cabin (e.g., side walls, next to a regular light unit, on a passenger service unit, on seat backs, in luxury suites, on bars, in a galley, etc.)

Figure 1:
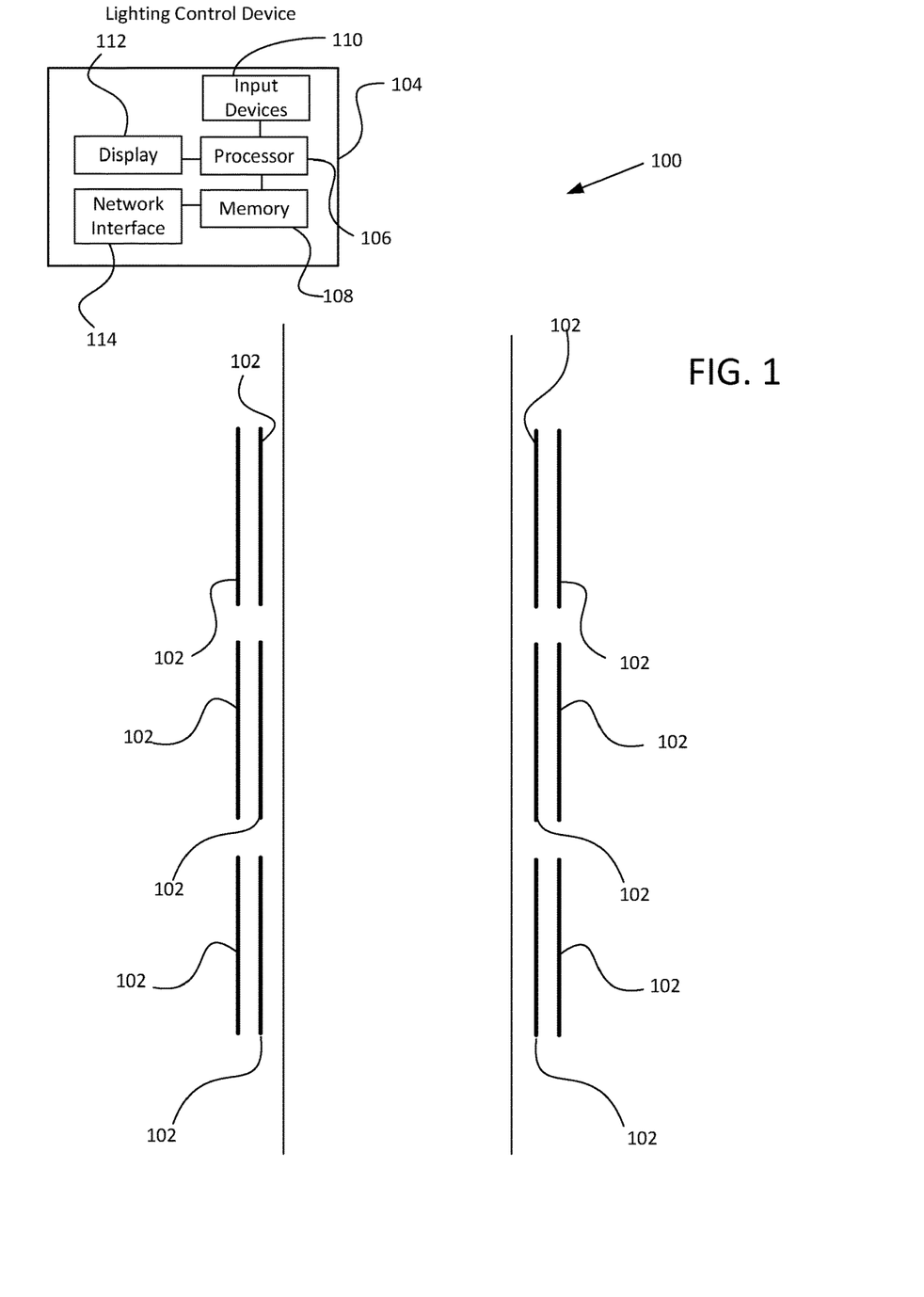
FIG. 1 is a block diagram of an aircraft lighting system in which various embodiments of the disclosure may be used.

Turning to FIG. 1, a lighting system 100 configured according to an embodiment is shown. The system 100 is depicted as being deployed in a passenger cabin of an aircraft. The system 100 includes multiple LED lighting assemblies 102 and a lighting control device 104 ("control device 104"). The control device 104 is communicatively linked to the LED lighting assemblies and transmits data to the addressable elements in those assemblies (e.g., the microcontrollers, which will be discussed below in more detail) using one or more protocols (such as the Serial Peripheral Interface ("SPI") bus protocol via a Universal Serial Bus to SPI interface). The control device 104 allows a person, such as flight attendant, to interact with the system 100 in order to, for example, control the lighting assemblies 102. The control device 104 includes a microprocessor 106, a memory 108 (e.g., volatile or non-volatile memory, random-access memory), user input devices 110 (e.g., switches, buttons, keyboard, mouse, or touchscreen), a display 112 (e.g., an organic, light-emitting diode display), and a network interface 114 (which may be wired or wireless). The display 112 may include one or more of the user input devices 110 (e.g., a touchscreen). The processor 106 is communicatively linked to the lighting elements 102 via the network interface 114 (e.g., by wired connection). The memory 108 can store multiple lighting schemes, animations sequences, and/or lighting scenes.

Figure 2A:
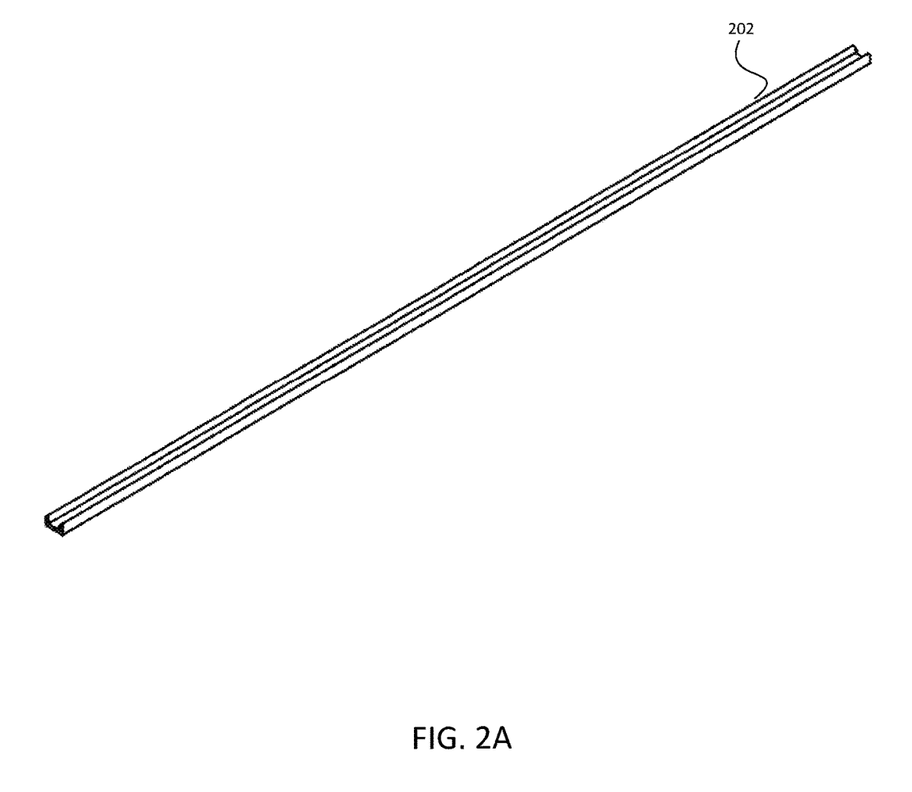
FIG. 2A is perspective view of the exterior of an LED lighting assembly, according to an embodiment.
Figure 2B:
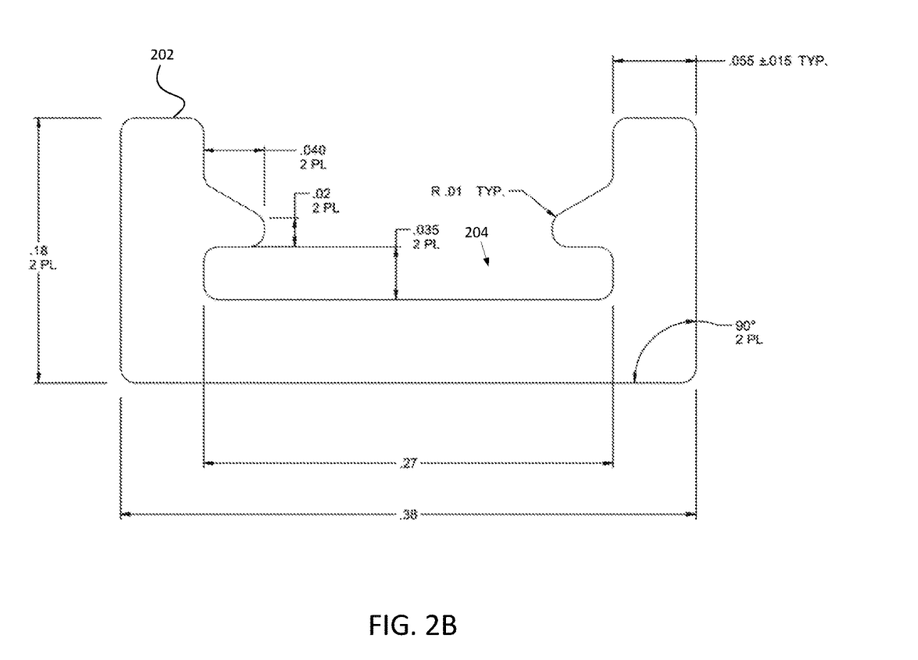
FIG. 2B is a side view of the exterior depicted in FIG. 2A.

Turning to FIG. 2A and FIG. 2B, an example of how an LED lighting assembly 102 (from FIG. 1) ("lighting assembly 102") may be configured according to an embodiment is shown. The LED lighting assembly 102 includes a flexible housing 202 made of, for example, silicone. Within the flexible housing 202 is flexible PCB, on which are mounted multicolor LEDs microcontrollers along with various supporting components. The housing 202 has a longitudinal channel 204, in which the PCB would be held. The dimensions shown in FIG. 2A and FIG. 2B are in inches. It is to be understood that the dimensions shown are for illustrative purposes and that other dimensions are possible. In an embodiment, the length of the housing 202 is 100 feet.

Figure 3A:
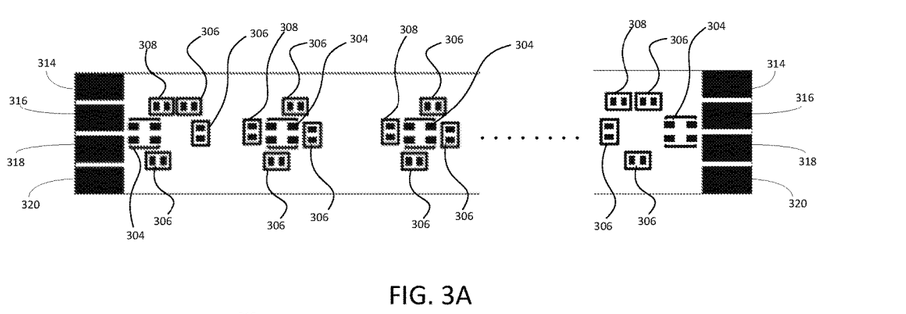
FIG. 3A and FIG. 3B are diagrams of a printed circuit board ("PCB") (one side in FIG. 3A and another side in FIG. 3B) configured according to an embodiment.
Figure 3B:
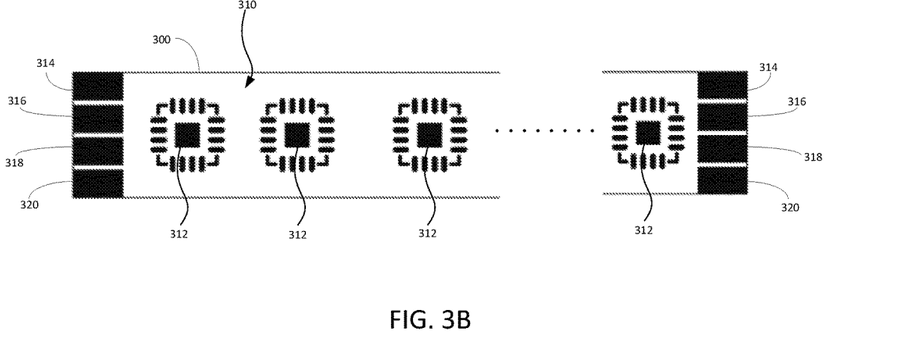

A PCB configured according to an embodiment is shown in FIG. 3A and FIG. 3B. The PCB, generally labelled 300, is flexible. Mounted on a first surface 302 of the PCB 300 are multicolor LED lights 304, resistors 306, and capacitors 308. Mounted on a second surface 310 are microcontrollers 312. Also on the PCB 300 are a power connector 314 (which is connected to a power plane of the PCB 300), an SPI data input ("SDI") connector 316 (which is connected to a data plane of the PCB 300), a clock connector 318 (which is connected to a clock plane of the PCB 300), and a ground connector 320 (which is connected to a he multicolor LED lights 304, resistors 306, capacitors 308 and microcontrollers 312 are electrically connected in various ways via flexible traces on the PCB 300, which are described in further detail in conjunction with FIG. 4.

Figure 4:
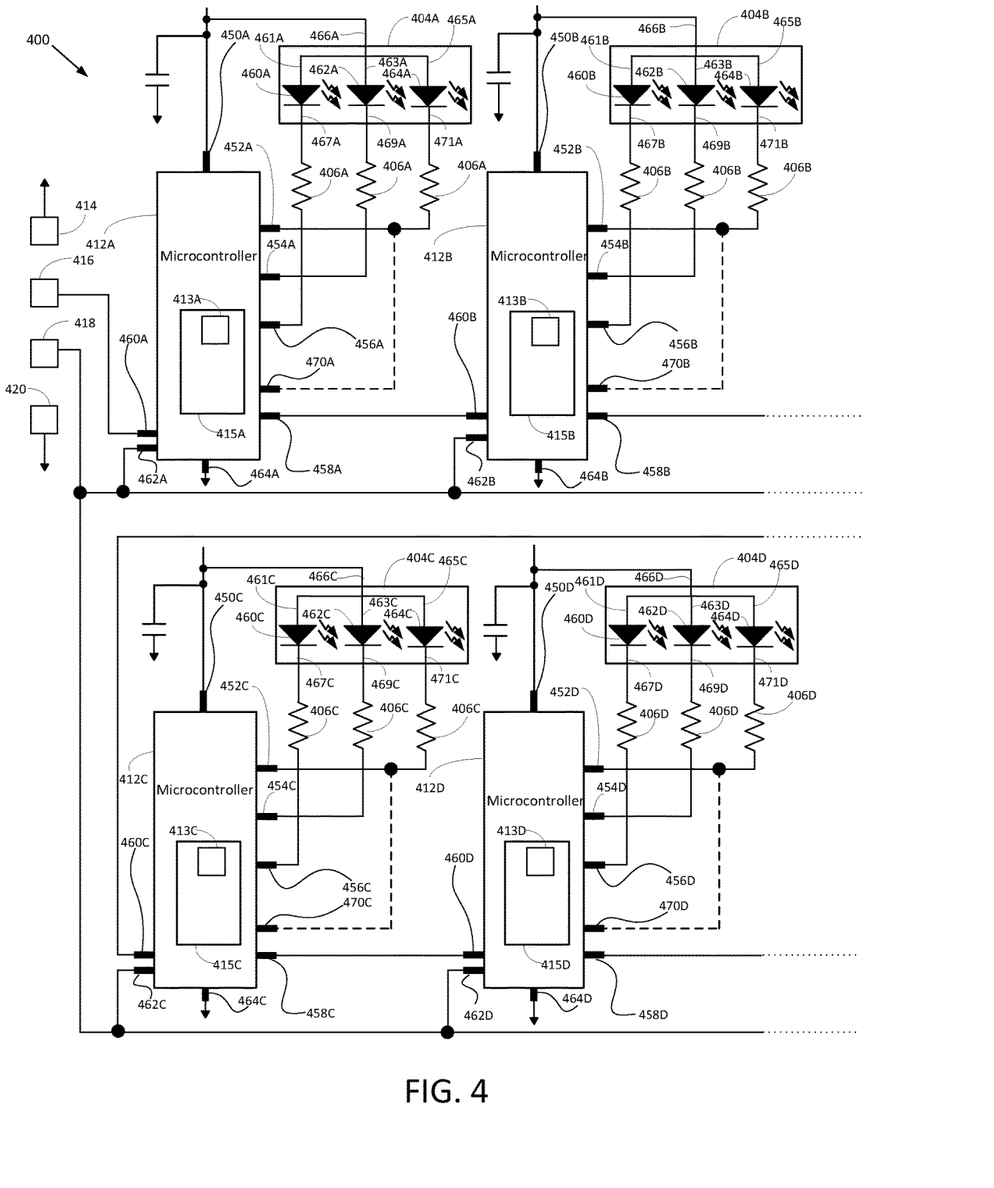
FIG. 4 is a circuit diagram depicting a lighting assembly configured according to an embodiment.

FIG. 4 is a schematic depicting components of an LED lighting assembly 400 according to an embodiment. The LED lighting assembly 400 is disposed on a PCB (such as the PCB 300 of FIGS. 3A and 3B) and includes a power connector 414, an SDI connector 416, a clock connector 418, and a ground connector 420. The connectors 414, 416, 418 and 420 have the same functionality described above in conjunction with FIG. 3 and, although not specifically depicted in FIG. 4, are also located on the far end of the circuit (e.g., on both ends of a PCB to which the components of FIG. 4 are attached). The LED lighting assembly 400 further includes microcontrollers 412A, 412B, 412C, and 412D. The first microcontroller 412A is electrically connected: to a positive voltage supply (5 volts direct current ("DC") in this example) via a first pin 450A; to a multicolor LED light 404A via second, third, and fourth pins 452A, 454A, and 456A; to a second microcontroller 412B via a fifth pin 458A; to the data plane via a sixth pin 460A; to the clock plane via a seventh pin 462A; and to the ground plane via an eighth pin 464A. On each circuit path between the microcontroller 412A and the multicolor LED light 404A is a resistor 406A.

The multicolor LED light 404A includes three LEDs: a green LED 460A, a blue LED 462A, and a red LED 464A. Each respective LED has a shared terminal (461A, 463A, and 465A (a shared anode in this example) and a non-shared terminal (467A, 469A, and 471A (a non-shared cathode in this example)). The LED light 404A has a shared terminal 466A that is shared the anodes of all of the LEDs.

According to an embodiment, the first pin 450A is a positive supply pin (Vdd), the second, third, and fourth pins 452A, 454A, and 456A are PWM pins, the fifth pin 458A is an SPI data output ("SDO") pin, the sixth pin 460A is an SDI pin, the seventh pin 462A is a clock input pin (such as a Schmitt trigger input), and the eight pin 464A is a ground reference (Vss) pin.

Although only four microcontroller-LED light pairs are depicted in FIG. 4, there may be any number (as suggested by the dotted lines). There may, for example, be 32 microcontroller-LED pairs per lighting assembly.

In an embodiment, the system depicted in the drawings functions as follows. A cabin crew member interacts with the control device 104 to select a particular lighting pattern (e.g., a lighting scenes, such as passenger boarding, mealtime, or landing). In response, the control device 104 transmits a set of instructions to the lighting assemblies 102. According to an embodiment, for each pixel in the lighting pattern, the instructions include (the address of the microcontroller that controls the LED light that is to display the pixel and luminance data for each of the LEDs in the LED light (e.g., red, green, and blue). In some embodiments, the instructions include the address, luminance data, and chrominance data, and it is up to the individual microcontrollers to control the individual LEDs to create the appropriate effect in accordance with the luminance and chrominance data.

When a microcontroller receives the pixel data addressed to it, the microcontroller raises and lowers the voltage at the respective PWM pins in order to generate a PWM signal for each of the LEDs so as to create the brightness and color specified by the luminance and chrominance data.

According to an embodiment, the LED lights in their respective lighting assemblies throughout the cabin are divided by zone based, for example, on seating class. Because the LED lights are separately addressable (via their respective microcontrollers) it is possible for any given lighting assembly to have, for example, half of its LED lights dedicated to business class and the other half dedicated to coach or economy class. Furthermore, if the amount of cabin space is dedicated to each class changes, the lighting scheme can easily be updated via software without the need for physically moving lighting assemblies.

In another example, if the lighting assembly included a flexible PCB and housing, the light could run along the periphery of a bar and then along the ceiling, with one zone (and color/animation scheme) on the bar and another (with a different color/animation scheme) on the ceiling.

Referring again to FIG. 4, in an embodiment, each microcontroller has an analog to digital converter ("ADC") pin (labeled 470A, 470B, 470C, and 470D in FIG. 4) that is electrically connected to one of the LEDs of the LED light (shown by the dashed line). The microcontroller uses this connection to measure the voltage across the LED and derive the temperature of the LED using the Shockley diode equation:

$$I = I_s \left( e^{\frac{V_D}{nV_T}} - 1 \right)$$

In the specific example of FIG. 4, the ADC pin 470A of the first microcontroller 412A is electrically connected to the non-shared terminal 471A of the red LED 464A, the ADC pin 470B of the second microcontroller 412B is electrically connected to the non-shared terminal 471B of the red LED 464B, the ADC pin 470C of the third microcontroller 412C is electrically connected to the non-shared terminal 471C of the red LED 464C, and the ADC pin 470D of the fourth microcontroller 412D is electrically connected to the non-shared terminal 471D of the red LED 464D.

Although the lighting assemblies are depicted as being linear, they need not be. For example, a lighting assembly (or groups of lighting assemblies) may be configured as a two dimensional array.

It should be understood that the embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope.

What is claimed is:

1. An aircraft cabin light-emitting diode ("LED") lighting assembly comprising:
   a plurality of microcontrollers, each microcontroller comprising a memory;
   a plurality of multicolor LED lights, wherein each respective microcontroller of the plurality of microcontrollers is paired with and controls a respective multicolor LED light of the plurality of multicolored LED lights;
   each multicolor LED light comprising a plurality of LEDs, each of the plurality of LEDs comprising a shared terminal and a non-shared terminal, wherein the shared terminal is electrically connected to a node that shared with the other LEDs of the plurality and the non-shared terminal is electrically connected to the microcontroller that is paired with the multicolored LED light, wherein at least one LED of the multicolor LED light is electrically connected to an analog to digital converter ("ADC") input of the microcontroller that is paired with the multicolored LED light;

each microcontroller being separately addressable and configured to:

receive pixel data via a data line, wherein the pixel data describes a pixel that is to be displayed by the multicolored LED light paired with the microcontroller, use the calibration data stored in its memory to calibrate the pixel, generate a separate pulse wave modulated signal to each of the non-shared terminals of the multicolor LED light to display the calibrated pixel, measure the voltage or current from the electrically connected LED on the ADC input, and use a Shockley diode equation and the measured voltage or current to derive the temperature of the LED that is electrically connected to the ADC input.

2. The lighting assembly of claim 1, further comprising a flexible printed circuit board ("PCB") on which the plurality of microcontrollers and the plurality of LED lights are mounted.

3. The lighting assembly of claim 1, wherein the shared terminal is an anode and the non-shared terminal is a cathode.

4. The lighting assembly of claim 1, wherein the non-shared terminal is an anode and the shared terminal is a cathode.

5. An aircraft cabin light-emitting diode ("LED") lighting system comprising:

a plurality of lighting assemblies located within an aircraft cabin, each lighting assembly comprising a plurality of microcontrollers and a plurality of multicolor LED lights, wherein each microcontroller comprises a memory, is separately addressable, is paired with a single multicolor LED light of the plurality of multicolor LED lights, and controls the brightness and color of the multicolored light with which it is paired, wherein at least one LED of the multicolor LED light is electrically connected to an analog to digital converter ("ADC") input of the microcontroller that is paired with the multicolored LED light; and a lighting control device communicatively linked to the plurality of lighting assemblies, wherein the lighting control device is configured to transmit pixel data to the plurality of lighting assemblies, wherein the pixel data represents a plurality of individual pixels in which each pixel maps to a single microcontroller-LED light pair, wherein each microcontroller uses calibration data stored in its memory to calibrate the pixel mapped to the microcontroller-LED light pair to which the microcontroller belongs, wherein each microcontroller is configured to measure the voltage or current from the electrically connected LED on the ADC input, and use a Shockley diode equation and the measured voltage or current to derive the temperature of the LED that is electrically connected to the ADC input.

6. The LED lighting system of claim 5, wherein the cabin control device is further configured to transmit one set of pixel data to microcontroller-LED pairs located in a first section of the aircraft cabin and another, different set of pixel data microcontroller-LED pairs located in a second section of the aircraft cabin.

7. The LED lighting system of claim 6, wherein the first section of the aircraft is a business or first class section and the second section is a coach or economy class section.

8. The LED lighting system of claim 6, wherein each of the plurality of lighting assemblies further comprises a flexible printed circuit board ("PCB") on which the plurality of microcontrollers and the plurality of LED lights are mounted.

9. The LED lighting system of claim 8, wherein the flexible PCB is housed within a flexible housing.

10. The LED lighting system of claim 6 wherein each multicolor LED light of the plurality comprises a plurality of LEDs, each of the plurality of LEDs comprising a shared terminal and a non-shared terminal, wherein the shared terminal is electrically connected to a node that shared with the other LEDs of the plurality and the non-shared terminal is electrically connected to the microcontroller that is paired with the multicolored LED light.

11. The LED lighting system of claim 10, wherein the shared terminal is an anode and the non-shared terminal is a cathode.

12. The LED lighting system of claim 10, wherein the non-shared terminal is an anode and the shared terminal is a cathode.

13. An aircraft cabin light-emitting diode ("LED") lighting assembly comprising a plurality of multicolor LED lights, each multicolor LED light comprising a plurality of LEDs;

a plurality of microcontrollers, wherein each respective microcontroller of the plurality of microcontrollers is electrically connected to a respective multicolor LED light and comprises a memory in which calibration data is stored, wherein each microcontroller is configured to receive, via a data line, data regarding a pixel to be displayed;

receive a voltage or current input from an LED of the plurality of LEDs of the multicolor LED light at an analog to digital input;

use a Shockley diode equation to calculate the temperature of the LED from which the voltage or current input was received based on the received voltage or current input; and generate a separate PWM signal to each of the LEDs of the multicolor LED light in accordance with the received pixel data, as calibrated according to the calibration data, and as adjusted for the calculated temperature.

14. The lighting assembly of claim 13, further comprising a flexible printed circuit board ("PCB") on which the plurality of microcontrollers and the plurality of LED lights are mounted.

15. The lighting assembly of claim 14 wherein each multicolor LED light of the plurality comprises a plurality of LEDs, each of the plurality of LEDs comprising a shared terminal and a non-shared terminal, wherein the shared terminal is electrically connected to a node that shared with the other LEDs of the plurality and the non-shared terminal is electrically connected to the microcontroller that is paired with the multicolored LED light.

16. The lighting assembly of claim 15, wherein the shared terminal is an anode and the non-shared terminal is a cathode.

17. The lighting assembly of claim 15, wherein the non-shared terminal is an anode and the shared terminal is a cathode.

18. The lighting assembly of claim 13, further comprising a camera that takes photographs of all or part of the lighting assembly, wherein the microcontroller uses data from the photographs to adjust the output of the plurality of LEDs.

* * * * *